US011066036B2

(12) United States Patent
Gwon et al.

(10) Patent No.: US 11,066,036 B2
(45) Date of Patent: Jul. 20, 2021

(54) FAR SIDE AIRBAG APPARATUS FOR VEHICLE

(71) Applicant: Autoliv Development AB, Vårgårda (SE)

(72) Inventors: Tae Ik Gwon, Hwaseong-si (KR); Par Sandinge, Vårgårda (SE); Mats Berntsson, Vårgårda (SE); Jong Ki Byun, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 197 days.

(21) Appl. No.: 16/092,250

(22) PCT Filed: Mar. 30, 2017

(86) PCT No.: PCT/KR2017/003470
§ 371 (c)(1),
(2) Date: Oct. 9, 2018

(87) PCT Pub. No.: WO2017/179839
PCT Pub. Date: Oct. 19, 2017

(65) Prior Publication Data
US 2019/0161053 A1 May 30, 2019

(30) Foreign Application Priority Data
Apr. 15, 2016 (KR) .................. 10-2016-0045893

(51) Int. Cl.
*B60R 21/231* (2011.01)
*B60R 21/207* (2006.01)
(Continued)

(52) U.S. Cl.
CPC .......... *B60R 21/23138* (2013.01); *B60N 2/64* (2013.01); *B60R 21/207* (2013.01);
(Continued)

(58) Field of Classification Search
CPC ................ B60R 21/207; B60R 21/231; B60R 21/23138; B60R 21/2338; B60R 2021/23146; B60R 2021/23161
See application file for complete search history.

(56) References Cited

U.S. PATENT DOCUMENTS

| 5,499,840 A | * | 3/1996 | Nakano | ................ | B60N 2/0705 280/730.1 |
| 5,575,497 A | * | 11/1996 | Suyama | ................ | B60R 21/231 280/730.1 |

(Continued)

FOREIGN PATENT DOCUMENTS

| JP | 2008-080919 A | 4/2008 |
| JP | 2010-076640 A | 4/2010 |

(Continued)

OTHER PUBLICATIONS

International Search Report for PCT/KR2017/003470, ISA/KR, Daejeon, dated Jul. 19, 2017, with English translation thereof.

*Primary Examiner* — Barry Gooden, Jr.
(74) *Attorney, Agent, or Firm* — Stephen T. Olson; Harness, Dickey & Pierce, P.L.C.

(57) ABSTRACT

A far side airbag apparatus for a vehicle for installation at a side of a frame of a backrest of a seat directed toward an inner center portion of the vehicle such that the far side airbag is expanded and deployed between at least two backrests arranged widthwise along the vehicle. The far side airbag includes an inner part directed toward an occupant seated in a direction opposite to a collision side of the vehicle upon vehicle collision and an outer part directed toward the inner center portion of the vehicle upon vehicle collision. When a vehicle collision occurs, for example, when a side inclination collision of the vehicle occurs, the occupant seated in opposition to the collision side of the vehicle may be prevented from abruptly moving toward the (Continued)

front portion and the inner center portion of the vehicle out of the protection range of the far side airbag. Thus, collision between occupants seated on a driver seat and an occupant seat can be effectively prevented.

17 Claims, 9 Drawing Sheets

(51) Int. Cl.
  *B60R 21/2338* (2011.01)
  *B60N 2/64* (2006.01)
(52) U.S. Cl.
  CPC ........ *B60R 21/231* (2013.01); *B60R 21/2338* (2013.01); *B60R 2021/23146* (2013.01); *B60R 2021/23161* (2013.01)

(56) References Cited

U.S. PATENT DOCUMENTS

| | | | | |
|---|---|---|---|---|
| 5,730,464 | A * | 3/1998 | Hill | B60R 21/23138 280/730.2 |
| 6,773,026 | B2 * | 8/2004 | Meyer | B60R 21/231 280/729 |
| 7,594,675 | B2 * | 9/2009 | Bostrom | B60R 21/207 280/728.2 |
| 7,992,894 | B2 | 8/2011 | Lim et al. | |
| 8,267,424 | B2 | 9/2012 | Tomitaka et al. | |
| 8,596,675 | B2 * | 12/2013 | Kwon | B60R 21/233 280/729 |
| 9,296,357 | B2 | 3/2016 | Fujiwara | |
| 9,358,943 | B2 * | 6/2016 | Borjeson | B60R 21/23138 |
| 9,428,136 | B2 | 8/2016 | Ishida et al. | |
| 2007/0096444 | A1 * | 5/2007 | Bostrom | B60R 21/23138 280/730.2 |
| 2010/0264631 | A1 | 10/2010 | Tomitaka et al. | |
| 2010/0283230 | A1 * | 11/2010 | Tomitaka | B60R 21/231 280/730.2 |
| 2010/0314859 | A1 | 12/2010 | Tomitaka et al. | |
| 2011/0025027 | A1 | 2/2011 | Lim et al. | |
| 2012/0091697 | A1 * | 4/2012 | Wiik | B60R 21/23138 280/730.2 |
| 2013/0113193 | A1 * | 5/2013 | Borjeson | B60R 21/231 280/730.2 |
| 2014/0097601 | A1 * | 4/2014 | Fukawatase | B60R 21/207 280/730.2 |
| 2015/0014970 | A1 * | 1/2015 | Fujiwara | B60R 21/233 280/730.2 |
| 2015/0158453 | A1 | 6/2015 | Fujiwara | |
| 2015/0274111 | A1 | 10/2015 | Ishida et al. | |
| 2015/0298639 | A1 * | 10/2015 | Mihm | B60R 21/207 280/728.2 |
| 2016/0075303 | A1 * | 3/2016 | Iida | B60R 21/2338 280/729 |
| 2016/0107604 | A1 * | 4/2016 | Fujiwara | B60R 21/23138 280/729 |
| 2016/0144821 | A1 * | 5/2016 | Fujiwara | B60R 21/207 280/730.2 |
| 2016/0159307 | A1 * | 6/2016 | Fujiwara | B60R 21/263 280/729 |
| 2016/0229369 | A1 * | 8/2016 | Thomas | B60R 21/231 |
| 2016/0264091 | A1 * | 9/2016 | Fujiwara | B60R 21/233 |
| 2017/0043741 | A1 * | 2/2017 | Kobayashi | B60N 2/42 |
| 2017/0072893 | A1 * | 3/2017 | Fujiwara | B60N 2/75 |
| 2017/0158160 | A1 * | 6/2017 | Sugimori | B60R 21/264 |
| 2017/0267205 | A1 * | 9/2017 | Numazawa | B60N 2/143 |
| 2017/0334386 | A1 * | 11/2017 | Park | B60R 21/2171 |
| 2018/0222433 | A1 * | 8/2018 | Byun | B60R 21/207 |
| 2018/0290620 | A1 * | 10/2018 | Berntsson | B60R 21/23138 |
| 2018/0370472 | A1 * | 12/2018 | Belwafa | B60R 21/0136 |
| 2019/0152421 | A1 * | 5/2019 | Byun | B60R 21/207 |
| 2019/0225183 | A1 * | 7/2019 | Garnier | B60R 21/207 |
| 2019/0299904 | A1 * | 10/2019 | Nagasawa | B60R 21/207 |
| 2020/0017055 | A1 * | 1/2020 | Deng | B60R 21/2338 |
| 2020/0047705 | A1 * | 2/2020 | Moon | B60R 21/23138 |
| 2020/0062212 | A1 * | 2/2020 | Markusic | B60R 21/23138 |

FOREIGN PATENT DOCUMENTS

| | | |
|---|---|---|
| JP | 5382585 B2 | 1/2014 |
| JP | 2015-110373 A | 6/2015 |
| JP | 2015-189399 A | 11/2015 |
| KR | 2011-0012749 A | 2/2011 |
| WO | WO-2009-035114 A1 | 3/2009 |

* cited by examiner

FAR SIDE AIRBAG APPARATUS FOR VEHICLE

CROSS-REFERENCE TO RELATED APPLICATIONS

This application is a 371 U.S. National Stage of International Application No. PCT/KR2017/003470, filed Mar. 30, 2017, which claims priority to Korean Patent Application No. 10-2016-0045893, filed Apr. 15, 2016. The disclosures of the above applications are incorporated herein by reference.

TECHNICAL FIELD

The present invention relates to a far side airbag apparatus for a vehicle, which is deployed between two seats arranged in the width direction of the vehicle to prevent a passenger from moving toward a center of the vehicle upon the vehicle collision.

BACKGROUND ART

In a vehicle provided with at least two seats arranged in the width direction of the vehicle, when an impact is applied to a side of the vehicle due to the side collision, an airbag apparatus generally protects a passenger seated on a seat near the impact side. This type of the airbag apparatus is generally referred to as a side airbag apparatus, in which an airbag and an inflator for supplying gas to the airbag are disposed inside a portion of a backrest of a seat, which is the collision side of the passenger. The inflator is configured to be disposed at a rear end in the airbag when the airbag is expanded, and the inflator is connected to a seat frame in the backrest while being connected to the airbag. The airbag is secured to the seat frame at a fastening portion of the inflator.

In such aside airbag apparatus, when an impact is applied to the side of the vehicle, inflation gas is supplied to the airbag from the inflator. Thus, the side airbag starts to expand by the inflation gas, and protrudes forward from the backrest of the seat with a part of the side airbag remaining in the backrest of the seat. Then, the side airbag is inflated forward through between the passenger and the side of the vehicle. Therefore, even if the passenger is urged to the impact side due to the side collision of the vehicle, the passenger is received by the inflated side airbag.

A far side airbag apparatus according to a related art is installed inside the backrest of the seat in the width direction of the vehicle and directed to the center of the vehicle to prevent the collision between passengers upon the vehicle collision.

The far side airbag apparatus is configured to restrict the passenger seated opposite to the collision side from moving toward the collision side when the side collision occurs at the opposite side (far side) from the installation side in the width direction of the vehicle. That is, the far side airbag apparatus is configured to restrain the passenger from moving toward the collision side upon the side collision of the vehicle.

When the side collision of the vehicle occurs, the passenger seated on a side opposite to the collision side moves toward the collision side of the vehicle.

When the oblique side collision of the vehicle occurs, for example, when an object collides with the side of the stopped vehicle at a predetermined angle, the passenger seated on a side opposite to the collision side may move toward the center and the front portion of the vehicle. In this case, the passenger is out of the protection range of the far side airbag, so that the risk of collision between two passengers seated in the vehicle in the width direction cannot be eliminated.

PRIOR ART DOCUMENT (Patent Document 1) International Publication No. WO2009-035114

(Patent Document 2) Japanese Unexamined Patent Publication No. 2015-110373

DISCLOSURE

Technical Problem

An object of the present invention to provide a far side airbag apparatus for a vehicle that can prevent a passenger seated on a side opposite to a collision side of the vehicle from moving toward the center and a front portion of the vehicle when the oblique side collision of the vehicle occurs.

Another object of the present invention is to provide a far side airbag apparatus for a vehicle having an improved support strength for increasing retrain force to passengers.

Technical Solution

In order to accomplish the above objects, according to an embodiment of the present invention, there is provided a far side airbag apparatus for a vehicle, the far side airbag apparatus including: a far side airbag installed at a side of a frame of a backrest directed toward an inner center portion of the vehicle such that the far side airbag is expanded and deployed between at least two backrests arranged in a width direction of the vehicle, and including an inner part directed toward a passenger seated on a side opposite to a collision side of the vehicle upon expansion and an outer part directed toward the inner center portion of the vehicle upon expansion, wherein, upon a vehicle collision, the inner part supports the passenger seated on a side opposite to the collision side of the vehicle toward an outer portion of the vehicle to prevent the passenger from moving toward the inner center portion and a front portion of the vehicle.

According to an embodiment of the present invention, the inner part of the far side airbag may be inclined toward the front portion and the outer portion of the vehicle.

According to another embodiment of the present invention, the inner part of the far side airbag may include a front protrusion part protruding outward from a front portion of the far side airbag.

According to another embodiment of the present invention, the inner part of the far side airbag may include: an inclination part inclined closer to the outer portion of the vehicle in a front direction of the vehicle upon expansion; and a front protrusion part protruding toward the outer portion of the vehicle from a front portion of the inclination part.

According to another embodiment of the present invention, the far side airbag apparatus may further include: a reinforcing panel having one side connected to a rear side of the far side airbag and an opposite side fixed to the frame of the backrest; and at least one tether member installed inside or outside the far side airbag and having one end connected to the far side airbag and an opposite end connected nearby a fixing part of the rear side of the far side airbag.

The opposite end of the tether member may be connected to the frame of the backrest.

The opposite end of the tether member may be connected to the reinforcing panel.

The far side airbag apparatus may further include an inflator fixed to the frame through a fastening member to supply gas to the far side airbag, wherein the opposite end of the tether member may be connected to the frame together with the inflator by the fastening member.

The far side airbag may have an expansion thickness corresponding to a width between a driver seat and a passenger seat of the vehicle.

Advantageous Effects

According to one embodiment of the present invention, the far side airbag is configured to support the passenger seated on a side opposite to the collision side to the outside of the vehicle upon the vehicle collision, for example, the inclined vehicle collision, so that the passenger can be prevented from moving toward the collision side while being urged to the center and the front portion of the vehicle, thereby effectively preventing the collision between passengers in the width direction of the vehicle.

According to one embodiment of the present invention, the reinforcing panel is formed at the rear of the far side airbag, and at least one tether member is disposed inside or outside the far side airbag such that the front end of the tether member can be connected to the far side airbag and the rear end of the tether member can be fixed to the frame of the backrest so that the supporting strength of the far side airbag can be increased.

MODES OF THE INVENTION

Hereinafter, embodiments of the present invention will be described in detail with reference to the accompanying drawings. However, the present invention is not limited to the embodiments described below, but may be implemented in various forms. The embodiments will make the disclosure of the present invention complete, and allow those skilled in the art to completely comprehend the scope of the present invention.

In the following description, reference symbol F denotes a forward direction of a vehicle to which a far side airbag of the present invention is applied, reference symbol R denotes a rearward direction of the vehicle, reference symbol U denotes an upward direction of the vehicle and reference symbol D denotes a downward direction of the vehicle. Reference symbol I denotes an inward direction of the vehicle when viewed in a width direction of the vehicle and reference symbol O denotes an outward direction of the vehicle when viewed in the width direction of the vehicle.

Figure 1:
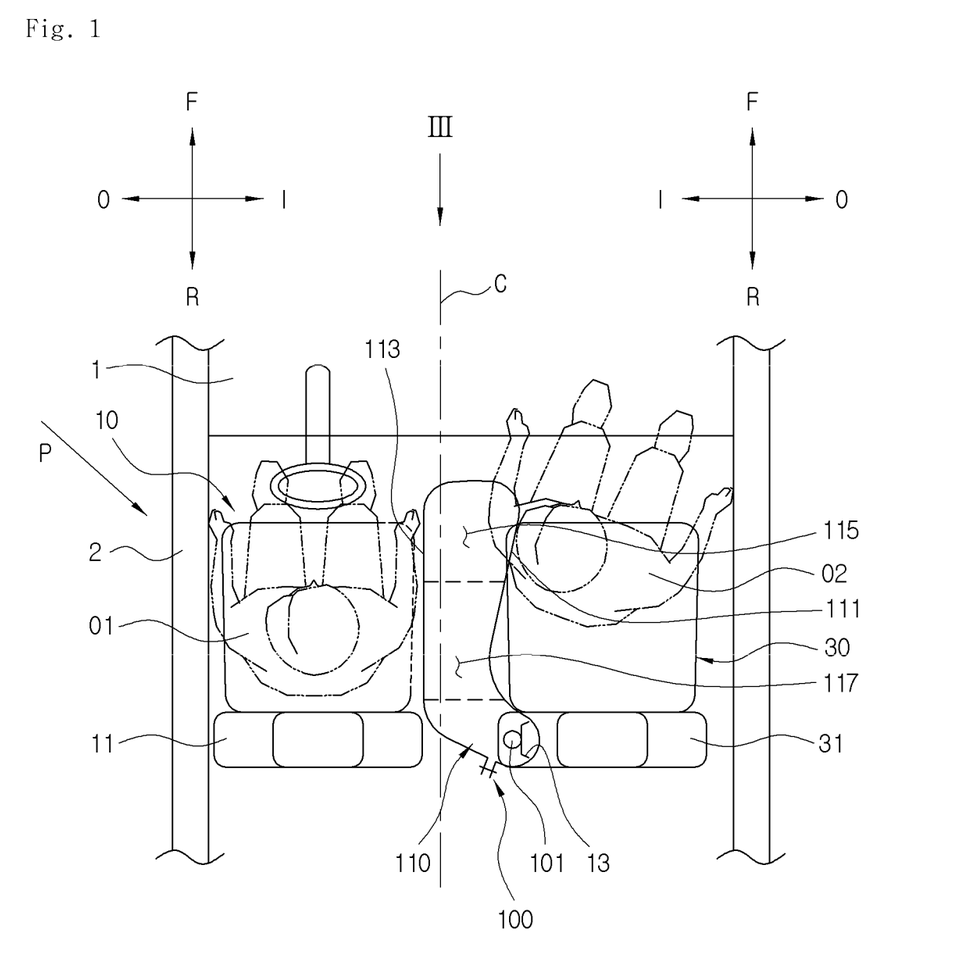
FIG. 1 is a plan view showing an interior of a vehicle to which an inflated far side airbag according to an embodiment of the present invention is applied.
Figure 2:
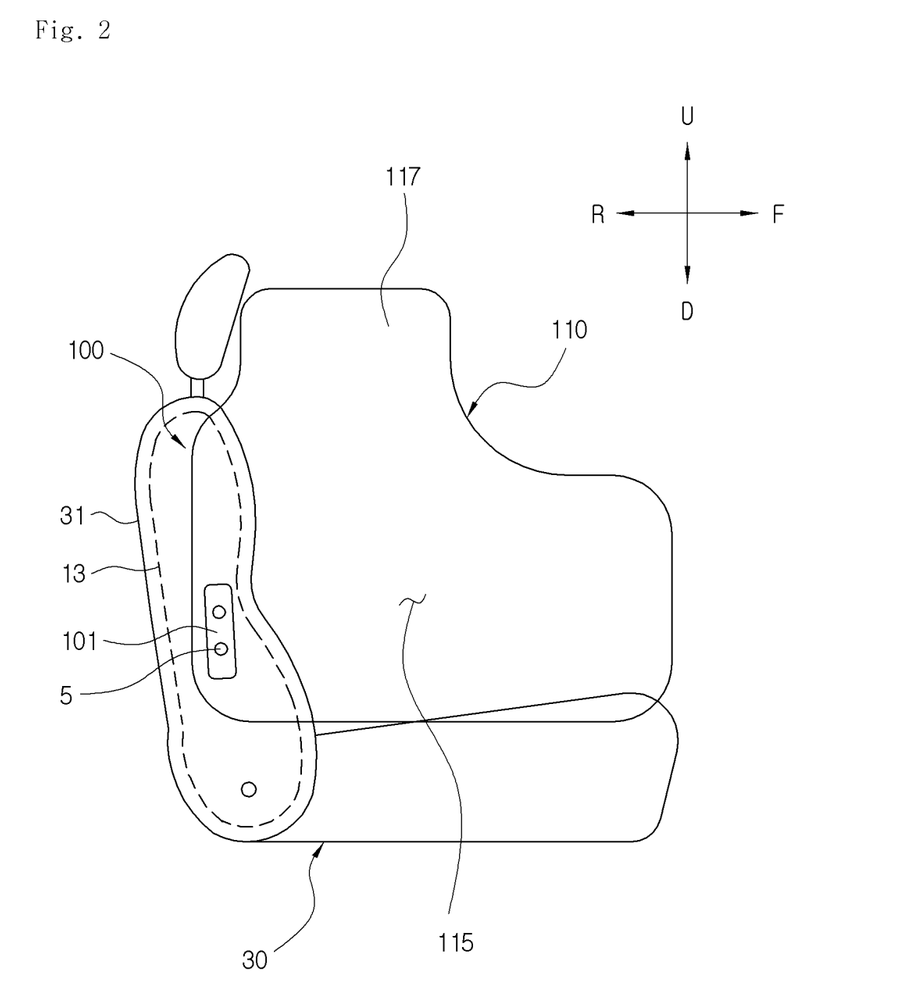
FIG. 2 is a side view showing the configuration of the inflated far side airbag according to an embodiment of the present invention.

FIG. 1 is a plan view showing an interior of a vehicle to which an inflated far side airbag according to an embodiment of the present invention is applied and FIG. 2 is a side view showing the configuration of the inflated far side airbag according to an embodiment of the present invention.

Referring to FIGS. 1 and 2, a far side airbag apparatus 100 is installed in a backrest of a vehicle seat. The vehicle seat may be disposed, for example, on the left and right sides with respect to the inner center C of the vehicle when viewed in the width direction of the vehicle. In the drawings, a driver seat 10 is arranged on the left side of the vehicle, and a passenger seat 30 is arranged on the right side of the vehicle with respect to the inner center C of the vehicle.

According to one embodiment of the present invention, the far side airbag apparatus 100 is installed inside a backrest 31 of the passenger seat 30. In another embodiment, the far side airbag apparatus 100 may be installed inside a backrest 11 of the driver seat 10 while being directed toward the center of the vehicle. In another embodiment, the far side airbag apparatus 100 may be installed in the driver seat 10 and the passenger seat 30 in order to selectively operate in accordance with the side collision or oblique side collision of the vehicle. According to the present invention, the far side airbag apparatus 100 is configured to operate from the seat opposite to the collision side of the vehicle to prevent a passenger seated on a side opposite to collision side from moving toward the collision side. Especially, the far side airbag apparatus 100 according to the present invention is configured to prevent the passenger seated on a side opposite to the collision side from moving toward the inner center and the outside of the vehicle upon the oblique side collision caused when an object collides with a side of the vehicle at a predetermined angle. The far side airbag apparatus 100 includes an inflator 101 serving as a gas generator and a far side airbag 110 which is inflated and deployed by receiving gas supplied from the inflator 101.

The inflator 101 is coupled to a frame 13 of the backrest 31 of the passenger seat 30 via a fastening member 5 and is connected to the rear of the far side airbag 110. The far side airbag 110 is received inside the backrest 31 in a folded state together with the inflator 101.

A rear end of the far side airbag 110 connected to the inflator 101 is supported inside the backrest 31. Thus, when inflated, the far side airbag 110 has a cantilever shape in which the rear end of the far side airbag 110 is supported by the frame 13 of the backrest 31 and the front end of the far side airbag 110 protrudes forward of the vehicle.

The far side airbag 110 includes an inner portion 111 facing the passenger and an outer portion 113 facing the inner center of the vehicle when inflated. According to one embodiment, the inner portion 111 and the outer portion 113 may be fabricated by using separate fabrics and connected to each other through a sewing line. In another embodiment, the inner portion 111 and the outer portion 113 of the far side airbag 110 may be formed of a single fabric.

The far side airbag 110 includes a main inflating portion 115 for protecting a shoulder portion, a chest portion, and an abdominal portion of the passenger and an upper inflating portion 117 extending upward from the main inflating portion 115 to protect a head portion of the passenger.

In another embodiment, the far side airbag 110 may further include a pelvic inflating portion that protects the pelvis of the passenger.

In one embodiment, the main inflating portion 115 and the upper inflating portion 117 may be formed of separate fabrics and connected to each other. In another embodiment, the main inflating portion 115 and the upper inflating portion 117 may be formed of a single fabric.

When inflated, the inner portion 111 of the far side airbag 110 is inclined such that the inner portion 111 is gradually closer to the side of the vehicle in the forward direction F of the vehicle, thereby preventing the passenger seated on a side opposite to the collision side from falling out of the protection range of the far side airbag 110 upon the oblique side collision of the vehicle by restraining the passenger from moving toward the front portion and the center of the vehicle, for example, while sliding along a front end of the far side airbag 110.

Due to the above configuration, when the oblique impact P is applied to the side of a vehicle body 2 adjacent to the driver seat 10 (hereinafter, referred to as a left oblique collision), the passenger O2 seated on the passenger seat 30 can be effectively prevented from moving toward the front portion and the inner center of the vehicle.

At the time of the left oblique collision, the passenger O2 seated on the passenger seat 30 moves in the forward direction F of the vehicle as well as toward the inner center C of the vehicle. In this case, since the inner portion 111 of the far side airbag 110 is inclined in the forward direction F and the outward direction O of the vehicle, when the passenger O2 seated on the passenger seat 30 obliquely moves in the forward direction F of the vehicle F and toward the inner center C of the vehicle, the inner portion 111 supports the passenger O2 in the outward direction of the vehicle.

Therefore, the passenger O2 can be prevented from moving out of the protection range of the far side airbag 110 so that the risk of collision between two passengers O1 and O2 seated on the driver seat 10 and the passenger seat 30, respectively, may be reduced.

Figure 3:
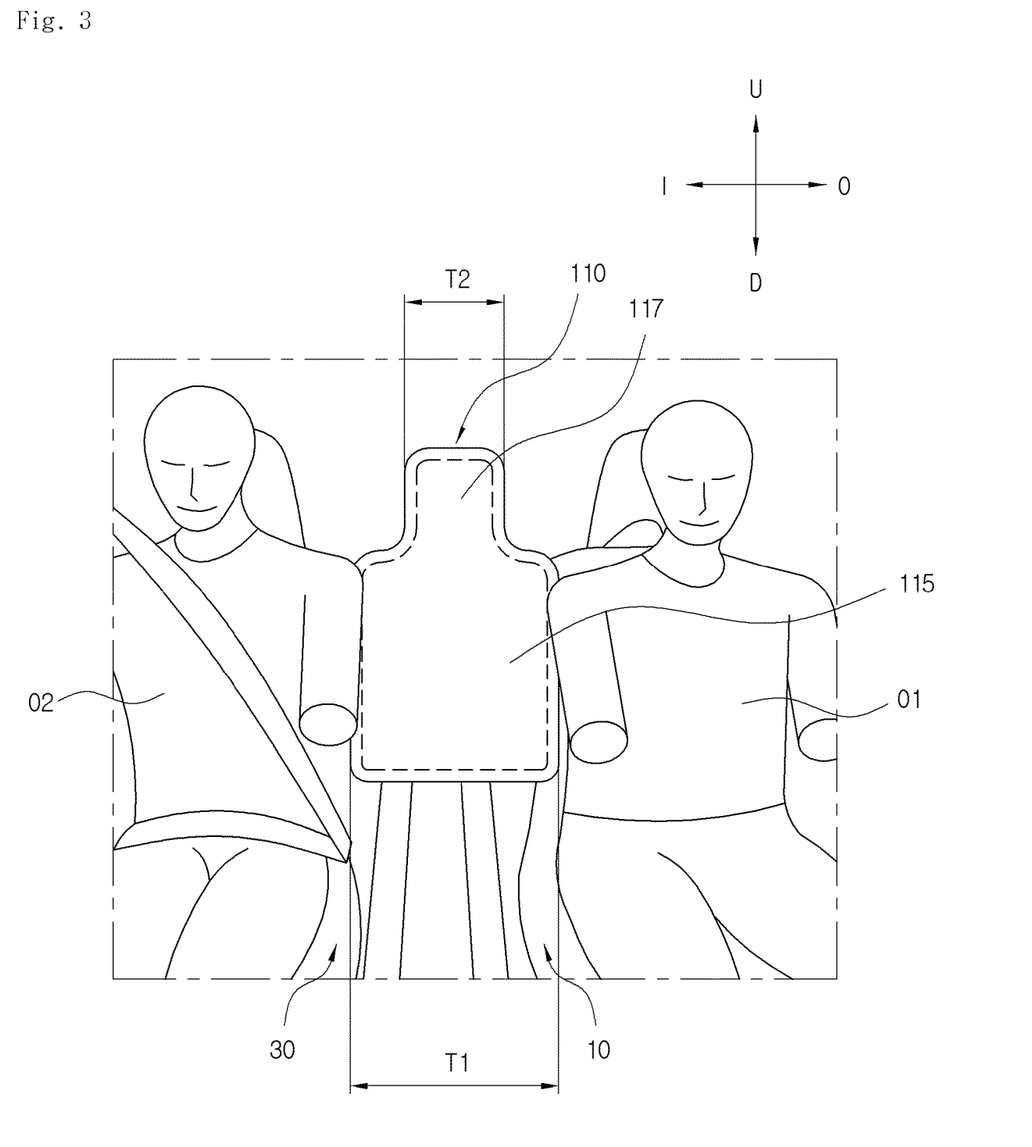
FIG. 3 is a front view taken along an arrow III of FIG. 1.

FIG. 3 is a front view taken along an arrow III of FIG. 1.

Referring to 3, the main inflating portion 115 of the far side airbag 110 is configured to have an expansion thickness T1 substantially equal to the distance between the driver seat 10 and the passenger seat 30, and the upper inflating portion 117 is configured to have an expansion thickness T2 smaller than the expansion thickness T1 of the main inflating portion 115. That is, the front side of the far side airbag 110 may have a T shape rotated by about 180 degrees.

As described above, since the expansion thickness T1 of the main inflating portion 115 of the far side airbag 110 is substantially equal to the distance between the driver seat 10 and the passenger seat 30, the far side airbag 110 can restrain the shoulder portion and the chest portion of the passenger O2 seated on the passenger seat 30 at the early stage of inflation of the far side airbag, thereby preventing the risk of collision between the two passengers O1 and O2.

Since the main inflating portion 115 can restrain the two passengers O1 and O2 at the early stage of inflation, the upper inflating portion 117 does not need to have the expansion thickness equal to the expansion thickness T1 of the main inflating portion 115, so the upper inflating portion 117 is configured to have the expansion thickness T2 smaller than the expansion thickness T1. Due to the above configuration, the airbag deployment speed can be improved and the head, shoulders, chest, and abdomen of the passenger can be properly protected.

The far side airbag 110 according to the present invention may further include a reinforcing structure for increasing the supporting strength.

Hereinafter, the same reference numerals will be assigned to the same components, and redundant description thereof will be omitted.

Figure 4A:
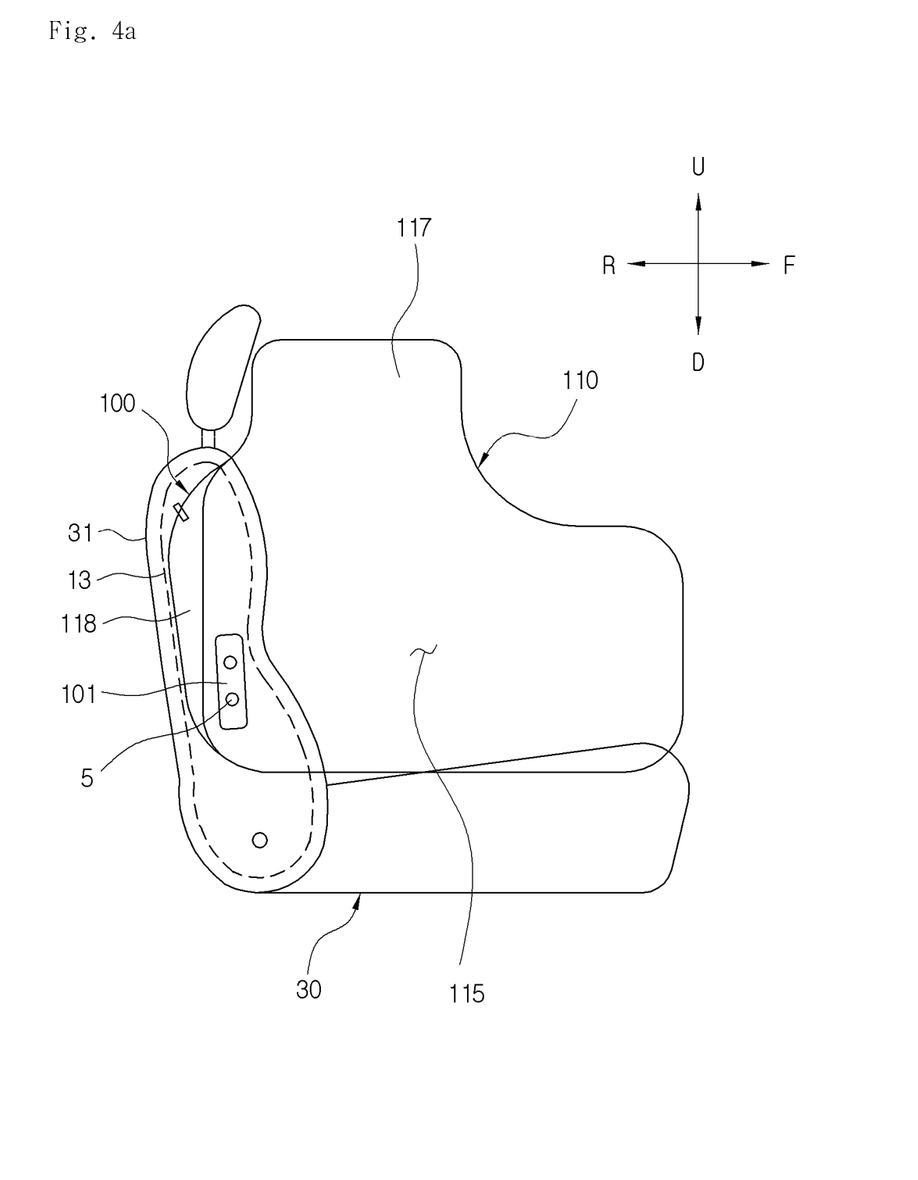
FIG. 4a is a side view showing the inflated state of the far side airbag having a reinforcing panel according to another embodiment of the present invention.

FIG. 4a is a side view showing the inflated state of the far side airbag having a reinforcing panel according to another embodiment of the present invention.

Referring to FIG. 4a, the far side airbag 100 may further include a reinforcing panel 118 connected to a rear side of the far side airbag 100.

One end of the reinforcing panel 118 may be connected to the rear end of the far side airbag 100 and the other end may be fixed to the frame 13 in the backrest 31 of the passenger seat 30. According to another embodiment, the reinforcing panel 118 may have a length extending in the forward direction F to partially surround a rear chamber portion 115 of the far side airbag 110. In this case, the reinforcing panel 118 may be configured to partially overlap the rear outer surface of the inner portion 111 or the outer portion 113 of the far side airbag 110.

Figure 4B:
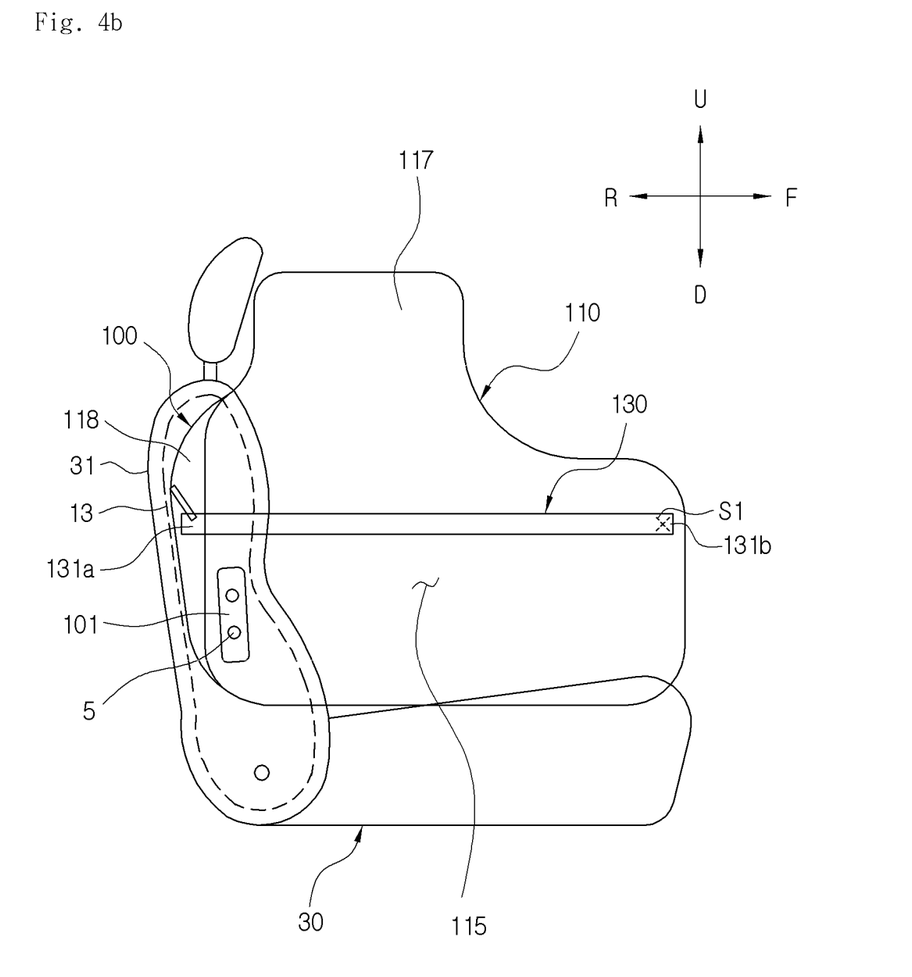
FIG. 4b is a view showing the configuration of a tether member of a far side airbag apparatus according to another embodiment of the present invention.

FIG. 4b is a view showing the configuration of a tether member of the far side airbag apparatus according to another embodiment of the present invention.

Referring to FIG. 4b, the far side airbag 110 according to one embodiment of the present invention may include at least one tether member 130 disposed inside or outside the far side airbag 110.

The tether member 130 may include a first tether member 131 having one end 131a fixed to the frame 13 and the other end 131b connected to the front portion of the far side airbag 110. The other end 131b of the first tether member 131 may be connected to the front portion of the far side airbag 110 by a sewing line S1. The first tether member 131 is configured to cross the front and rear directions of the far side airbag 110 so that, when the far side airbag 110 is inflated and deployed, the front end of the far side airbag 110 can be guided to deploy in the forward direction F from the backrest 11.

Figure 4C:
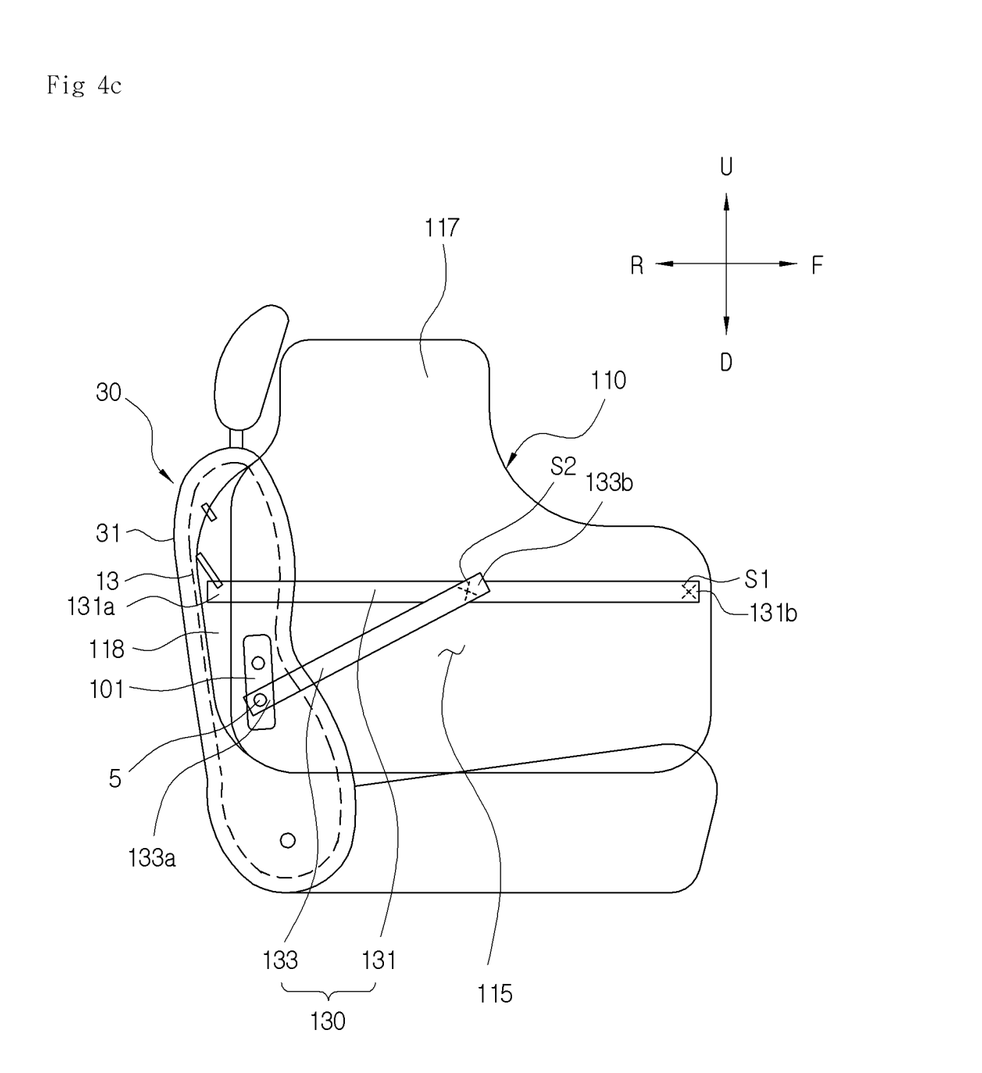
FIG. 4c is a view showing the configuration of another tether member of afar side airbag apparatus according to another embodiment of the present invention.

FIG. 4c is a view showing the configuration of another tether member of the far side airbag apparatus according to another embodiment of the present invention.

Referring to FIG. 4c, the tether member 130 may further include a second tether member 133 in addition to the first tether member 131 shown in FIG. 4b. The second tether member 133 may have a first end 133a connected to the frame 13 by a fastening member 5 that connects the inflator 101 to the frame 13, and the other end 133b connected to the far side airbag 110, for example, connected to the center of the far side airbag 110. The other end 133b of the second tether member 133 may be connected to the far side airbag 110 by a sewing line S2.

Figure 4D:
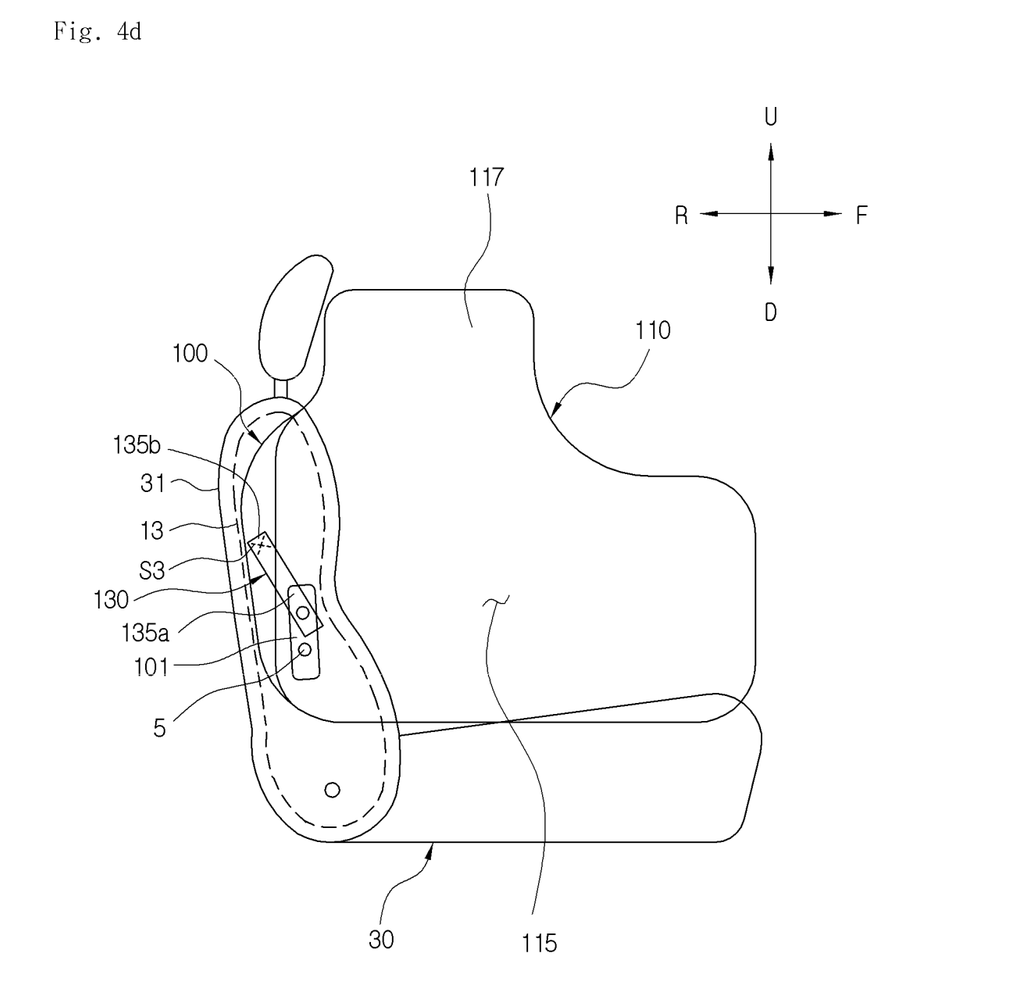
FIG. 4d is a view showing the configuration of still another tether member of a far side airbag apparatus according to another embodiment of the present invention.

FIG. 4d is a view showing the configuration of still another tether member of a far side airbag apparatus according to another embodiment of the present invention.

Referring to FIG. 4d, the tether member 130 may include a third tether member 135 having one end 135a fixed to the frame 13 together with the inflator 101 by the fastening member 5 that connects the inflator 101 to the frame 13, and the other end 135b connected to the reinforcing panel 118. The other end 135b of the third tether member 135 may be connected to the reinforcing panel 118 by a sewing line S3.

Since the rear side of the far side airbag 110 is fixed to the frame 13 in a plan view, the far side airbag 110 forms a cantilever when it is deployed.

For example, if the passenger O2 collides with the far side airbag 110, the far side airbag 110 is rotated in the counter-clockwise direction about a portion fixed to the frame 13, so that the restraining force to the passenger may be lowered (see FIG. 1).

To solve the above problem, according to one embodiment of the present invention, the reinforcing panel 118 and the tether member 130 are provided to increase the supporting strength of the far side airbag 110, thereby enhancing the passenger protection effect.

In other words, one sides of the reinforcing panel 118 and the tether member 130 are supported by the frame 130 and the other sides of the reinforcing panel 118 and the tether member 130 are connected to the far side airbag 110 so that, when the passenger O1 collides with the far side airbag 110, the reinforcing panel 118 and the tether member 130 provide tension against the rotational force of the far side airbag 110 that rotates about the portion fixed to the frame, thereby preventing the far side airbag 110 from rotating. Thus, the passenger restraining effect can be enhanced.

In more detail, referring to FIGS. 4a to 4d, one end of the reinforcing panel 118 is connected to the rear side of the far side airbag 118 and the other end is fixed to the frame 13. In addition, one sides 131a, 133a and 135b of the first to third tether members 131, 133 and 135 are fixed to the frame 13 and the other sides 131b, 133b and 135b are fixed to the far side airbag 110. Thus, when inflated, the rear side of the far side airbag 110 is pushed toward the frame 13 by the first to third tether members 131, 133 and 135 and the rear end thereof is restrained by the reinforcing panel 118. Accordingly, even if a moment based on the load of the passenger O2 is applied to the far side airbag 110, a moment that cancels the moment caused by the load of the passenger O2 may be generated due to the restraining force of the reinforcing panel 118 and the repulsive force of the first to third tether members 131, 133 and 135. Therefore, it is possible to effectively restrict the rotation of the far side airbag 110 that may rotate about the portion where the fastening member 5 is connected.

The far side airbag device 10 of the present invention can effectively prevent the passenger from moving toward the center C of the vehicle in the width direction of the vehicle.

In another embodiment of the present invention, the tether member 130 may be provided inside the far side airbag 110. In this case, the coupling scheme for the tether member 130 may be similar to the coupling scheme for the tether members 131, 133, and 15 described above.

Figure 5:
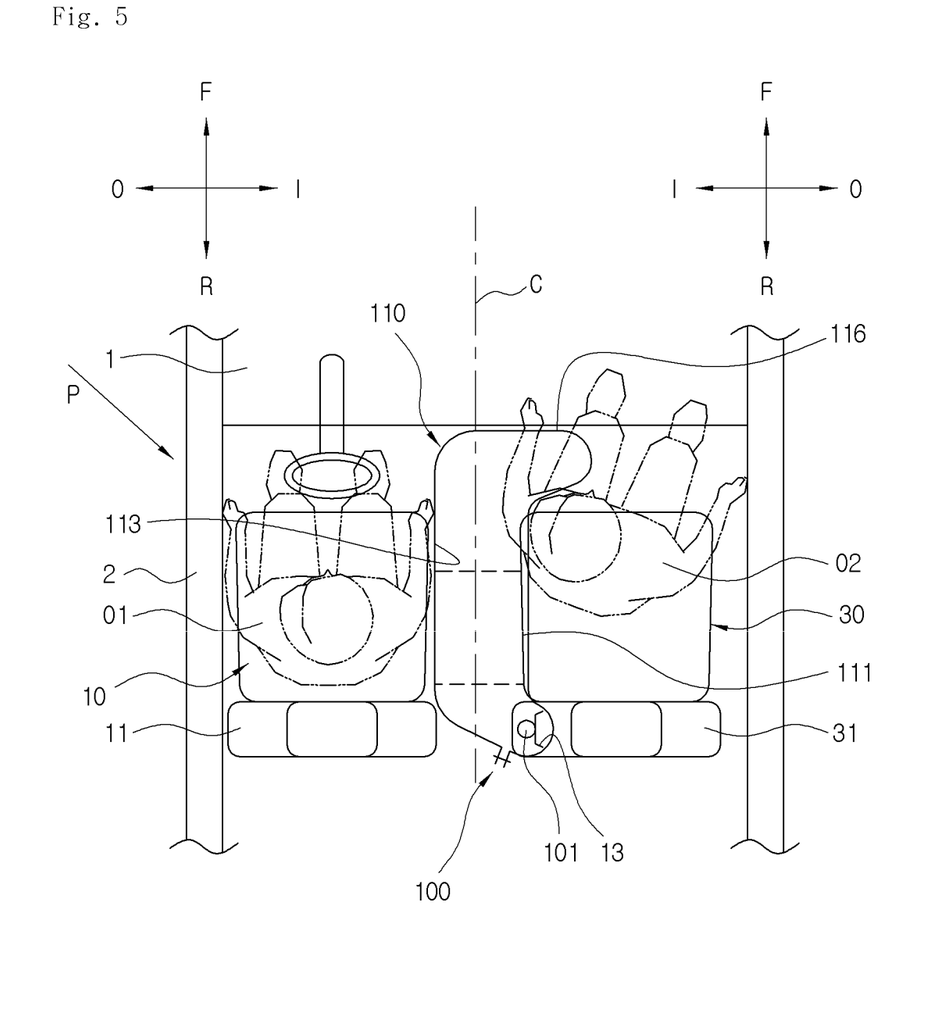
FIG. 5 is a plan view showing an interior of a vehicle to which an inflated far side airbag according to another embodiment of the present invention is applied.

FIG. 5 is a plan view showing an interior of a vehicle to which an inflated far side airbag according to another embodiment of the present invention is applied. Hereinafter, the same reference numerals will be assigned to the same components, and redundant description will be omitted.

Referring to FIG. 5, the far side airbag 110 includes a front protrusion 116 which is provided at a front end of the far side airbag 110 and protrudes in the outward direction O of the vehicle.

Due to the above configuration, for example, when the left oblique collision of the vehicle occurs, the inflator 101 installed in the backrest 31 of the passenger seat 30 is operated to generate gas and the gas generated from the inflator 101 inflates the far side airbag 110. In this case, the front protrusion 116 provided at the front end of the far side airbag 110 further protrudes in the outward direction O of the vehicle to support the front side of the passenger O2. Thus, the passenger O2 seated on the passenger seat 30 is restrained by the inner portion 111 and the front protrusion 116 of the far side airbag 110 so that the passenger O2 can be prevented from moving in the forward direction F and toward the center C of the vehicle.

Figure 6:
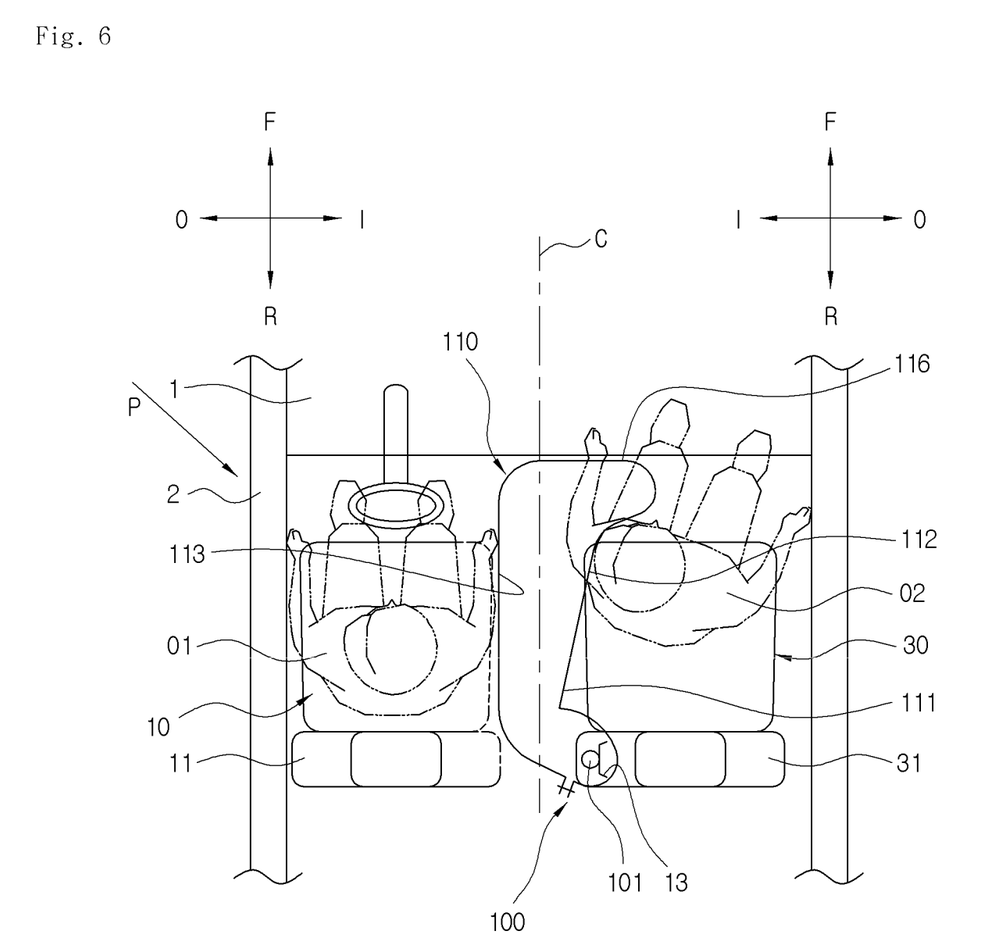
FIG. 6 is a plan view showing an interior of a vehicle to which an inflated far side airbag according to still another embodiment of the present invention is applied.

FIG. 6 is a plan view showing an interior of a vehicle to which an inflated far side airbag according to still another embodiment of the present invention is applied. Referring to FIG. 6, the far side airbag 110 is provided at a front end thereof with the front protrusion 116 for supporting a front portion of the passenger O2 seated on the passenger seat 30, and an inclination portion 112, which is formed by inclining the inner portion 111 of the far side airbag 110, is formed between the front protrusion 116 and the inflator 101.

Due to the above configuration, for example, when the passenger O2 seated on the passenger seat 30 moves in the forward direction and toward the center C of the vehicle caused by the left oblique collision of the vehicle, the passenger O2 may be surrounded and restrained by the inclination portion 112 and the front protrusion 116 of the far side airbag 110. As a result, the collision between the two passengers O1 and O2 can be prevented.

The far side airbag apparatus 100 shown in FIGS. 5 and 6 may further include the configuration of the reinforcing panel 118 and the tether member 130 as described above.

Although the present invention has been described in detail with reference to the embodiments, the present invention is not limited to the above-described embodiments, and various modifications may be made without departing from the scope of the present invention.

The invention claimed is:

1. An airbag apparatus for a seat of a vehicle in combination with the seat, the airbag apparatus comprising:
    an airbag installed at a first lateral side of a frame of a backrest of the seat, the airbag deployable between the backrest of the seat and a further backrest of a further seat arranged laterally to the seat, the airbag including an inner part and an oppositely facing outer part, the inner part directed toward an occupant seated in the seat upon expansion of the airbag,
    wherein upon expansion of the airbag, the inner part has a concave shape in a horizontal plane and the airbag has a thickness between the inner part and the outer part that increases in a forward direction and the inner part supports the occupant seated in the seat to prevent the occupant from moving toward an inner center portion and a front portion of the vehicle, and
    wherein the outer part is planar in the horizontal plane from the backrest to a forward end of the airbag, and
    wherein the concave shape of the inner part of the airbag extends in the horizontal plane from the backrest of the seat forwardly toward a forward end of the airbag.

2. The airbag apparatus of claim 1, wherein the inner part of the airbag is inclined toward the front portion and an outer portion of the vehicle.

3. The airbag apparatus of claim 1, wherein the inner part of the airbag includes a front protrusion part protruding outward from a front portion of the airbag.

4. The airbag apparatus of claim 1, wherein the inner part of the airbag includes:
    an inclination part inclined closer to an outer portion of the vehicle in a front direction of the vehicle upon expansion; and a front protrusion part protruding toward the outer portion of the vehicle from a front portion of the inclination part.

5. The airbag apparatus of claim 1, wherein the airbag has an expansion thickness corresponding to a width between a driver seat and an occupant seat of the vehicle.

6. The airbag apparatus of claim 1, in combination with the vehicle.

7. The airbag apparatus of claim 1, wherein the airbag has a first inflated dimension in the horizontal plane proximate a front surface of the seat back, a second inflated dimension in the horizontal plane proximate at the forward end, and a third inflated dimension at a center of curvature of the concave shape of the inner part.

8. The airbag apparatus of claim 1, wherein the inner part linearly extends from the concave shape to the forward end of the airbag.

9. The airbag apparatus of claim 1, wherein the airbag has a maximum inflated dimension in the horizontal plane proximate a forward end of the airbag.

10. The airbag apparatus of claim 1, further comprising:
    a reinforcing panel having one side connected to a rear side of the airbag and an opposite side fixed to the frame of the backrest; and
    at least one tether member installed at an inside or outside of the airbag and having one end connected to the airbag and an opposite end connected nearby a fixing part of the rear side of the airbag.

11. The airbag apparatus of claim 10, wherein the opposite end of the at least one tether member is connected to the reinforcing panel.

12. The airbag apparatus of claim 10, wherein the opposite end of the at least one tether member is connected to the frame of the backrest.

13. The airbag apparatus of claim 12, further comprising an inflator fixed to the frame through a fastening member to supply gas to the airbag, wherein the opposite end of the at least one tether member is connected to the frame together with the inflator by the fastening member.

14. A method of protecting an occupant of a vehicle in response to a side impact collision with the airbag apparatus of claim 1, the method comprising:
    providing the airbag apparatus for protection of the occupant of the vehicle seated adjacent the first lateral side of the vehicle, the airbag installed at the first lateral side of the frame of the backrest of the seat; and
    deploying the airbag apparatus in response to a side impact collision event at a second lateral side of the vehicle, the second lateral side being opposite the first lateral side;
    wherein the airbag is deployed between the backrest of the first seat and a second backrest of a second seat, the first and second seats arranged widthwise within the vehicle.

15. The method of protecting the occupant of the vehicle of claim 14, wherein upon deployment of the airbag, the inner part of the airbag is inclined toward the front portion and an outer portion of the vehicle.

16. The method of protecting the occupant of the vehicle of claim 14, wherein upon deployment of the airbag, the inner part of the airbag includes a front protrusion part protruding outward from a front portion of the airbag.

17. The method of protecting the occupant of the vehicle of claim 14, wherein upon deployment of the airbag, the inner part of the airbag includes:
    an inclination part inclined closer to an outer portion of the vehicle in a front direction of the vehicle upon expansion; and
    a front protrusion part protruding toward the outer portion of the vehicle from a front portion of the inclination part.

* * * * *